INVENTOR
WILEY WHITNEY
BY J. A. McCorkendale
ATTORNEY

INVENTOR
WILEY WHITNEY
BY
I. R. McCorkendale
ATTORNEY

INVENTOR
WILEY WHITNEY
BY
[signature]
ATTORNEY

United States Patent Office 3,532,831
Patented Oct. 6, 1970

3,532,831
CROSSBAR LINK CIRCUIT WITH A COMMON GROUP OF SELECTABLE CALL-WAITING CIRCUITS

Wiley Whitney, 2829 NE. 33rd Court, Apt. 603
Fort Lauderdale, Fla. 33306

Filed Dec. 16, 1968, Ser. No. 783,841
Int. Cl. H04m 3/42
U.S. Cl. 179—18 10 Claims

ABSTRACT OF THE DISCLOSURE

A crossbar link circuit is utilized in conjunction with a group of selectable call-waiting circuits for providing call-waiting service in step-by-step telephone systems. Each call-waiting line has a vertical appearance on two crossbar switches of the link circuit while the call-waiting circuits of the group are connected to horizontals of the switches. A call-waiting circuit is selected and connected to a call-waiting customer's line after a second call is received for the line while it is in busy condition on a first call. The call-waiting circuit, after being so connected, determines whether the state of the call-waiting customer's line is such that the call-waiting tone may be given to him.

My invention relates to a crossbar link circuit and more particularly to a crossbar link circuit used in conjunction with a group of call-waiting circuits for providing call-waiting service to step-by-step telephone customers.

BACKGROUND OF THE INVENTION

In recent years, attendant upon the overall improvement and expansion of telephone switching systems in general, it has become feasible to provide to telephone customers many so-called "special services" which result in a more comprehensive and efficient performance both from the standpoint of the customer and the telephone companies. Among such special services is the important call-waiting service.

Call-waiting service, as the designation indicates, is a service whereby a "special service" customer, hereinafter referred to also as the "call-waiting customer," during the time his line is "busy" on a first call, may be informed, for example by an audible tone applied to his line, that a second call is waiting for connection to his line. If he desires, the customer may then interrupt the first call and answer the waiting call. Means are usually included whereby repeated transfers between the two calls can be made under control of the call-waiting customer.

Until very recently the provision of call-waiting service in conjunction with telephone systems of the step-by-step type has involved perplexing problems stemming from the difficulty of preventing a call-waiting call from interfering with a call being originated by the special-services or call-waiting customer but not yet answered by the called customer at the time the call-waiting call connection is attempted. However, a recently developed call-waiting circuit which successfully solves these probleems is described in my co-pending application, Ser. No. 732,420, filed May 27, 1968, "Auxiliary Telephone Line Circuit for Call-Waiting Service," now Pat. No. 3,517,139.

While the arrangement described by the application just mentioned solves the particular problems referred to above in an effective manner an provides satisfactory call-waiting service to step-by-step customers, it is recognized that the arrangement does require the fixed assignment of a call-waiting circuit to each call-waiting line. In other words, a call-waiting circuit is actually being used only when the line to which it is assigned is in active use and, then only when a second call to that line is involved. Under certain conditions this might appear objectionable from an economical standpoint.

Accordingly, it is an object of my invention to improve call-waiting services.

Another object of my invention is to provide call-waiting service in a step-by-step telephone system under improved economic conditions.

A still further object of my invention is to render feasible the utilization of a selectable group of call-waiting circuits in conjunction with a substantially larger number of call-waiting lines.

BRIEF DESCRIPTION OF THE INVENTION

In accordance with a specific illustrative embodiment of my invention, a group of similar call-waiting circuits is provided for operating, as selected, in conjunction with a substantially larger number of call-waiting lines. Under "single call" conditions the call-waiting line operates in its normal manner, i.e. without any connection of a call-waiting circuit; each call-waiting line is provided with a first appearance and a second appearance on the PBX connector which is of the hunting type.

A call-waiting link including crossbar selecting switches is provided; each call-waiting line having vertical appearances on two respective switches and the respective call-waiting circuits being terminated on horizontals of the same switches. In the event a second call is received for a call-waiting customer's line while the first connector appearance of the line is "busy" with a first call the call-waiting link cononects a call-waiting circuit, selected from the group on a preference basis, into the already established connection of the call-waiting line without interfering in any way with the first call. The second call is connected via the second connector appearance of the call-waiting line and a second vertical appearance in the call-waiting link to the previously selected call-waiting circuit.

The selected call-waiting circuit includes a noval arrangement of interrelated relay circuits which function to determine at the time the call-waiting circuit is brought into the connection whether the call-waiting customer should be apprised of the second call at that point, for example by a tone, or whether such apprisal should be delayed and, also, whether audible ringing tone or line busy tone should be supplied at this time to the second caller. In general this will depend upon the condition, i.e. answered or unanswered, of the call initiated by the call-waiting customer via the line finder switch or a call received by the customer via the first connector appearance.

It will be understood that the term, "call-waiting line" as used above and hereinafter refers to the line circuit of the "special service" or "call-waiting" customer and that the term "call-waiting circuit" refers to the additional circuit provided specifically for the call-waiting service.

A feature of my invention is means for selecting and connecting a call-waiting circuit to a call-waiting customer's line after a second call has been received for the line while the line is busy on a first call.

Another feature of my invention is means for determining in the call-waiting circuit after it has been connected to the line whether or not at that time call-waiting tone should be supplied to the call-waiting customer or whether that action should be delayed and audible ringing tone or line busy tone be supplied to the second caller.

BRIEF DESCRIPTION OF THE DRAWING

A full understanding of the arrangement contemplated by the present invention as well as an appreciation of the various advantageous features thereof may be gained from consideration of the following detailed description in connection with the accompanying drawing in which.

DETAILED DESCRIPTION OF THE INVENTION

Figure 1:
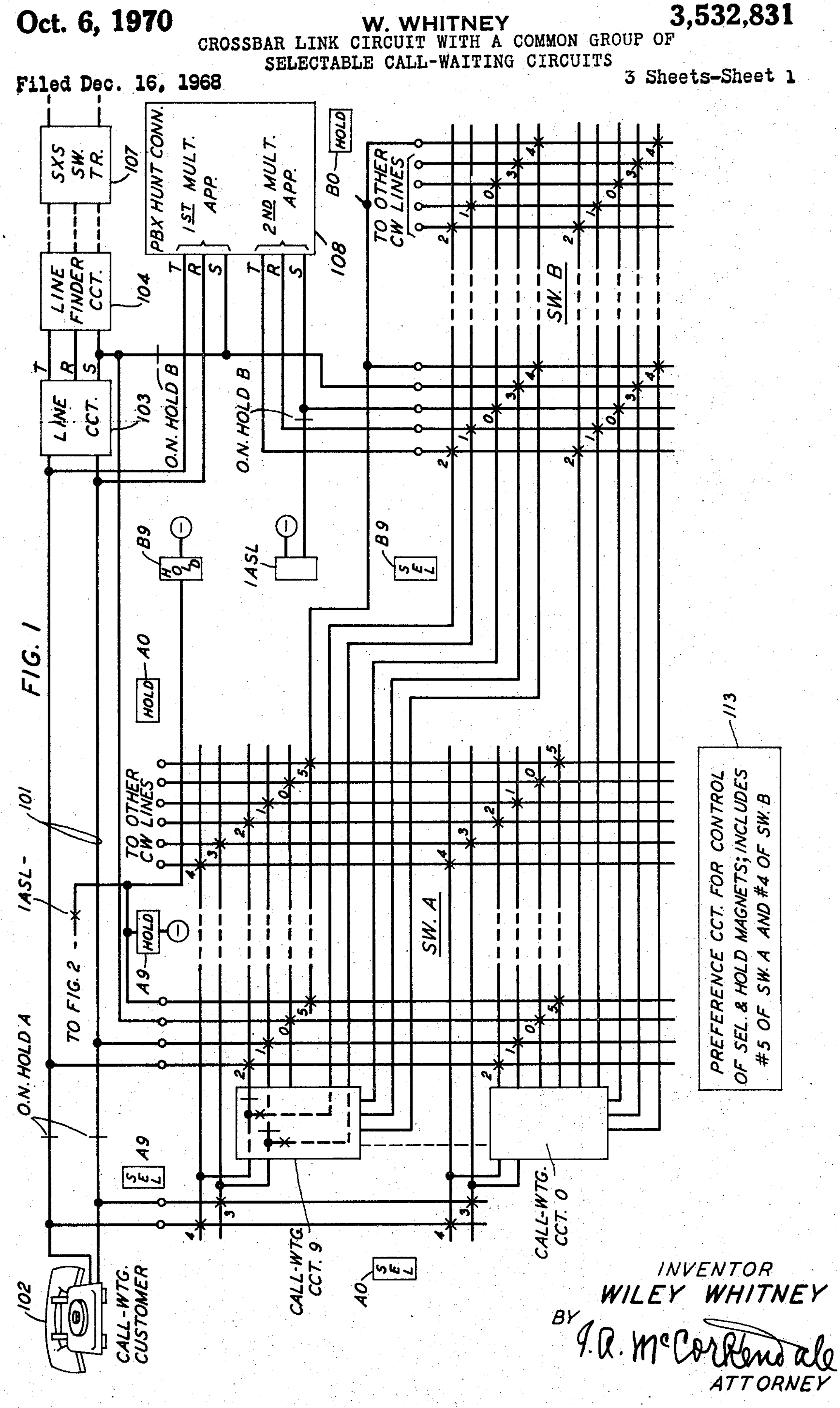
FIG. 1 shows schematically the general arrangement contemplated by a specific illustrative embodiment of the invention wherein a selected one of a group of call-waiting circuits may be connected to a call-waiting customer's line when a second call is received for the line.

Referring now to the drawing, it will be noted that the drawing is of the "detached contact" type wherein individual contacts are shown separated from the relay windings which control them and wherein an "X" represents a normally open or "make" contact of a relay and a bar, shown intersecting a conductor at right angles, represents a normally closed or "break" contact of a relay; "normally" referring to the unoperated or released position of a relay. The principles of this type of drawing are described in an article entitled, "An Improved Detached-Contact-Type Schematic Circuit Drawing" by F. T. Meyer in the September 1955 publication of the American Institute of Electrical Engineers Transactions, Communications and Electronics, vol. 74, pp. 505–513. In the present disclosure each major item, such as a relay, is given a designation including a prefix corresponding to the figure of drawing in which the item appears, for example relay 2H2 shown in FIG. 2. In addition each contact, or contacts in the instance of a transfer pair, is given a designation comprising a prefix corresponding to that of the controlling relay followed by a digit identifying the contact number of that relay and, finally, by a digit in parenthesis showing the figure of the drawing in which the contact appears. For example, the designation "2H2–1(3)" indicates that contact #1 of relay 2H2 appears in FIG. 3 while the relay itself, as just pointed out, appears in FIG. 2.

Referring first to FIG. 1, there is represented schematically, and in a general nature, an arrangement according to a specific illustrative embodiment of my invention wherein a plurality, assumed to be ten, of call-waiting circuits is selectably associated with a typical call-waiting customer's line. The arrangement will be described only in general terms at this point as the involved circuitry will be described in detail subsequently with reference to FIGS. 2 and 3.

A representative call-waiting line 101 is shown connecting the call-waiting customer's station set 102 through the usual line circuit 103 and line finder circuit 104 to step-by-step switch train 107. As shown, and as will be described in detail subsequently, two multiple appearances of the call-waiting line are provided for on PBX hunting connector 108.

In order to avoid undue complication and enlargement of the disclosure, such standard items as line circuit, line finder, step-by-step switch train, PBX hunting connector and the like are shown only as captioned rectangles and are not described in detailed herein. These items are well known in the art and perform in their normal and well-understood manner in this connection. It is well known, nector, if the first appearance of the line on the con- for example, that in the instance of the hunting type connector be found "busy" an attempt will automatically be made to complete to the second appearance. In the present instance the first appearance on the multiple will be held busy on calls originated by the call-waiting customer as well, of course, as on incoming calls terminated on this first appearance while the call-waiting customer's line is idle. The second appearance is utilized in connection with "second" calls to the customer's line as will be described in detail subsequently.

It is assumed by way of example that the group of call-waiting circuits comprises ten separate circuits "9" to "0"; two of these circuits, "9" and "0" are shown in the drawing and the presence of the other eight circuits "8" to "1" inclusive is indicated by the dotted line. It is assumed, by way of further example, that ten call-waiting customer's lines are to be served by the call-waiting circuits via the link switches illustrated but it will be understood that in actual practice a larger number of lines will be served through provision either of larger capacity switches or by provision of a larger number of switches. The crossbar switches illustrated, Switch A and Switch B, are assumed to be of the type which comprise ten separate groups of horizontal paths and ten separate groups of vertical paths. SELECT and HOLD magnets are provided in conjunction with switches A and B in accordance with well understood crossbar switch construction and operation and these magnets perform the normal, well-understood functions.

Now assuming that call-waiting station 102 has initiated a call over line 101 this call will be processed in the normal and well-understood manner; the call will be completed through the line finder and switch train and the first connector appearance of the line will be "busied." Now, if while this connection is being completed, or if completed is still active, a second call arrives for the call-waiting customer's line, this second call will be terminated at the second connector appearance and the call-waiting link and preference circuit (FIG. 2) will be activated following operation of the auxiliary sleeve relay of the particular line, in this instance relay 1ASL.

Figure 2:
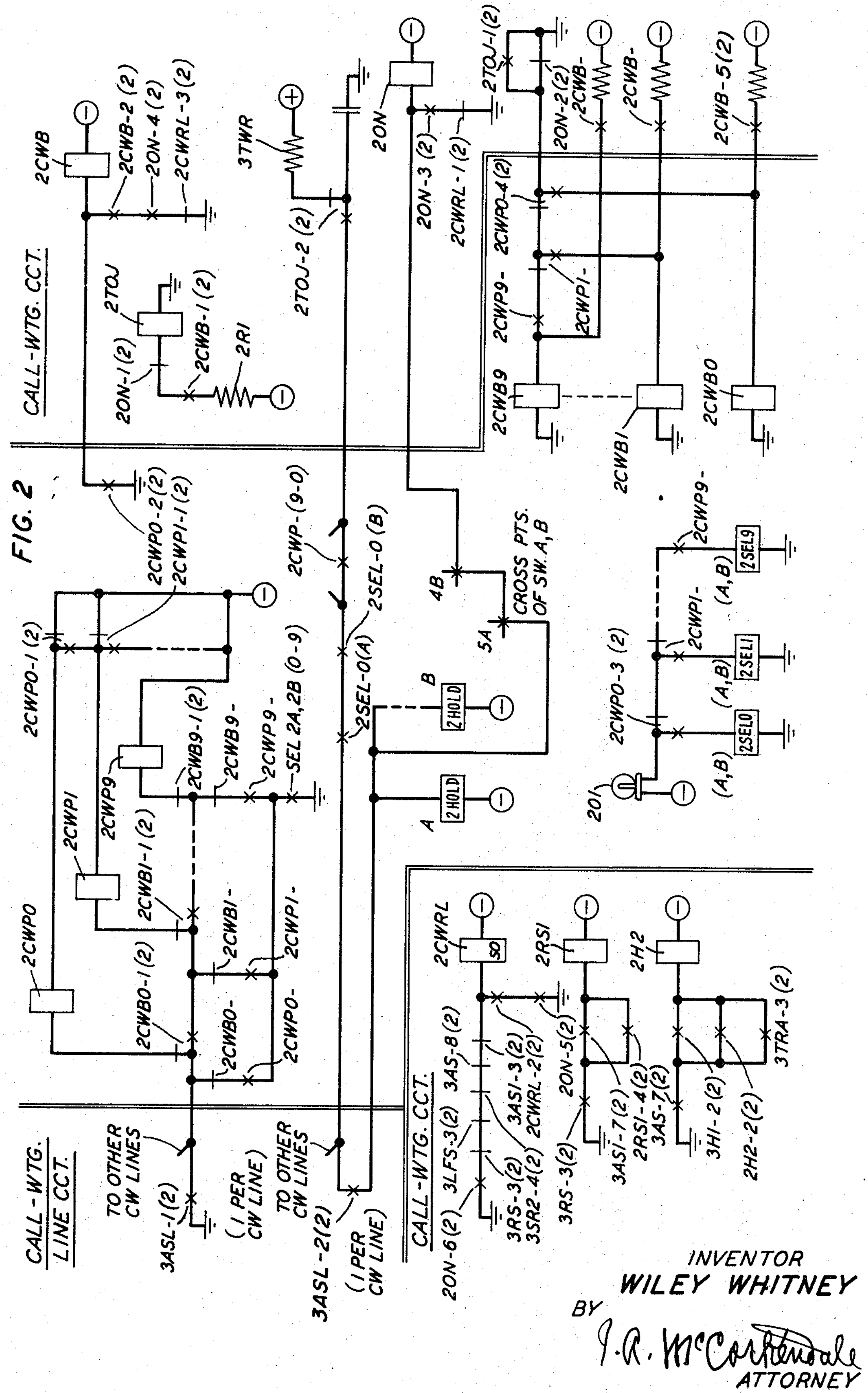
FIG. 2 shows particularly the link and preference circuit, a portion of the associated call-waiting circuit being included in this figure for purposes of simplification.

The link and preference circuit, operating in a manner described in detail subsequently with reference to FIG. 2, functions to select an idle call-waiting circuit, here assumed to be call-waiting circuit "9," and to bring it in on the existing connection. Crossbar switches A and B are operated in the normal manner, in this instance select magnets A9 and B9 and hold magnets A9 and B9 being operated whereby to close the particular crosspoints of each switch effective to bring call-waiting circuit "9" in on the connection both with respect to the first connector appearance and the second connector appearance. The line is opened at contacts of the off normal contacts of the A hold magnet and call-waiting circuit 9 in effect is inserted at this point. As will be clear from FIG. 3, the selected call-waiting circuit is actually inserted *between* the connections to crosspoints 3 and 4 and the connections to crosspoints 1 and 2.

Figure 3:
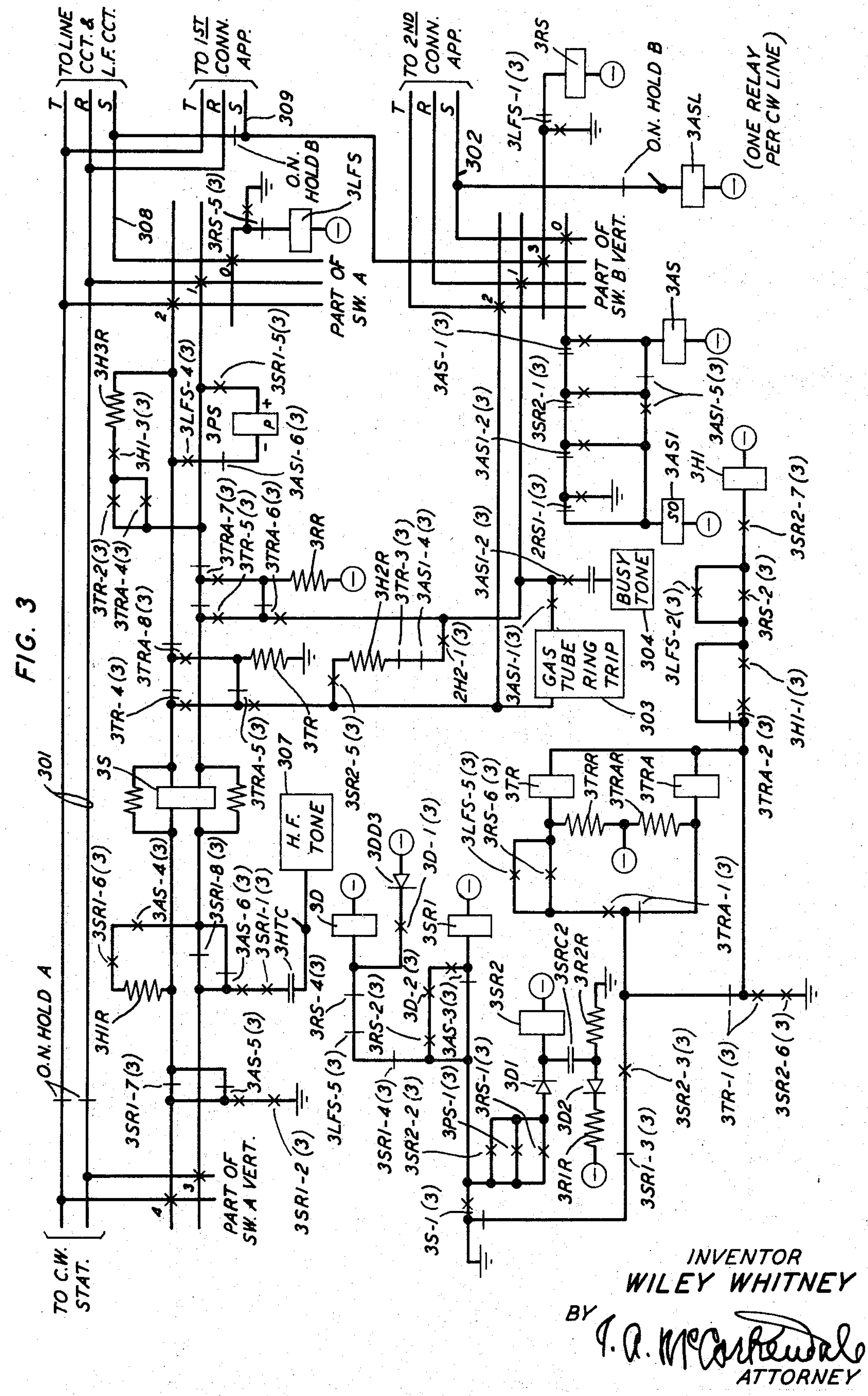
FIG. 3 shows in detail the remainder of the call-waiting circuit as contemplated by the invention.

At the time the selected call-waiting circuit is brought in on the connection, novel arrangements included in the circuit, particularly interrelated relay circuits which are shown in detail in FIG. 3 and fully described with reference particularly to FIG. 3, are effective to determine automatically whether at this point call-waiting tone will be supplied to the call-waiting customer or whether such action will be delayed and either audible ringing tone or line busy tone will be supplied to the caller terminated at the second connector appearance. In general this will ordinarily be determined in accord with the progress of the connection originally initiated by the call-waiting customer via the line switch or received by the customer via the first connector appearance. For example, if this connection has not yet been completed, that is if the called party has not yet answered, it is desirable that the connection not be interfered with at this point. Accordingly call-waiting tone would not be supplied to the call-waiting customer but the caller terminated at the second connector appearance would be held and would receive audible ringing tone and/or line busy tone. On the other hand, had the called party responded to the first call at the time the second call came in, then it would be desirable that the call-waiting customer be apprised promptly of the second call by receipt of call-waiting tone so that he could decide whether to transfer to the second call or to stay with the first call until completion. Also, in those cases where the original connection is responded to after receipt of the second call, it is desirable that the call-waiting tone be transmitted promptly upon such response. As will be clear from subsequent detailed description these functions are performed automatically and efficiently by the novel arrangements contemplated by my invention.

It will be noted that, while a connection is made to the second connector appearance via Switch B, a talking connection between the call-waiting customer and the second connector appearance is not closed until certain operations, contingent upon initiation of a transfer action by the call-waiting customer, have occurred; the transfer functions will be described in detail subsequently with particular reference to FIG. 3.

With regard to the showing of Switches A and B, it will be understood that the intervening call-waiting circuits are connected to intervening sets of horizontals in a manner generally similar to that shown for circuits "9" and "0" and that other respective call-waiting lines are connected to the other sets of verticals in a manner generally similar to that shown for line 101. Each line has associated with it an auxiliary sleeve relay corresponding to relay IASL of line 101 and operation of any one of these relays activates the call-waiting link circuit in the manner described.

A.—Calls originating from call-waiting customer station

Referring now to FIG. 3 for a more detailed description of the contemplated arrangement, it will be assumed first that a call is originated by the call-waiting customer's station and line corresponding respectively to station 102 and line 101 referred to above; it will be assumed, further, that at the time the call is originated all circuits are in idle condition.

When the customer goes off-hook and closes the line loop through the station set, the line is cut through to the first selector of the switch train, the first connector appearance is made busy, dial tone is transmitted to the caller and, finally, ringing is applied to the line, all these functions being in accord with well-understood step-by-step switching procedures and as briefly described in reference to FIG. 1.

It will be assumed now that at this point, i.e. before the call originated by the call-waiting customer has been answered, an incoming call directed to the call-waiting customer's line is received. In line with the normal operation of the hunting connector, the second call is terminated at the second connector appearance of the line and relay 3ASL operates from the ground applied to sleeve lead 302 through the connector. Assuming for purposes of further description that all preference relays, 2CWP0–2CWP9, are in idle condition, a path is now closed for operating preference relay 2CWP0 from ground at make contact 3ASL–1(2), break contact of transfer pair 2CWBO–1(2), winding of relay 2CWP0, break contact of transfer pair 2CWP0–1(2) to battery; immediately following operation of relay 2CWP0 the path to battery is completed via make contact of transfer pair 2CWP0–1(2) and the break contact of transfer pair 2CWP1–1(2).

Relay 2CWB of the call-waiting circuit (included in FIG. 2 for purposes of simplified disclosure) now operates from ground at a make contact of the particular preference relay operated (in this case make contact 2CWPO–2(2) of relay 2CWPO), winding of relay 2CWB to battery. Also at this point select magnets 2SELO of both switches A and B operate from battery, resistance lamp 201, make contact of transfer pair 2CWPO–3(2), windings of select magnets A and B (shown as a single coil for purposes of simplification) to ground; resistance lamp 201 provides protection against excessive current through two select magnets in parallel.

Relay 2TOJ, also of the call-waiting circuit, operates following operation of relay 2CWB from battery, resistor 2RI, make contact 2CWB–1(2), break contact 2ON–1(2), winding of relay to ground. It will be noted that operation of relay 2TOJ prevents operation of relays of the group 2CWBO–2CWB9 of the selected switch by closing at make contact 2TOJ–1(2) a shunting path to ground for the operate battery. For example, operation of relay 2CWBO from battery via make contact 2CWB–5(2) is prevented as the battery is shunted to ground via the make contact of transfer pair 2CWPO–4(2) and make contact 2TOJ–1(2). CWB-relays for other switch levels may operate however.

Hold magnets, 2HOLD–A and 2HOLD–B, corresponding to the call-waiting line involved, now operate from the dual voltage paths through the respective windings, make contact 3ASL–2(2), make contacts of select magnets 2SELO(A) and 2SELO(B), make contact of the particular preference relay operated (in this instance the 2CWPO), make contact of transfer pair 2TOJ–2(2) to ground. The crosspoints on the verticals of switches A and B are now closed whereby to connect the selected call-waiting circuit (shown in detail in FIG. 3) to the call-waiting customer's line. This includes, of course, a connection partially completed via switch B to the second line appearance on the hunting connector, this connection being closed subsequently upon operation of relays 3TR and 3TRA.

At the time the Hold magnets operate, the normal direct connection of the call-waiting line to the line circuit and line finder circuit is interrupted at the off-normal contacts O.N.HOLD–A and the connection is now accomplished through the selected call-waiting circuit. Also the operate path of relay 3ASL is interrupted at off-normal contact O.N.HOLD–B and the relay releases; the connection between the winding of relay 3RS and sleeve 308 is also interrupted at an O.N. contact of HOLD B but the path to sleeve 309 is maintained.

Relay 2ON operates from the Hold magnets potentials, closed switch crosspoints 5A and 4B, winding of relay 2ON to battery; relay 2ON upon operating locks to ground through its make contact 2ON–3(2) and break contact 2CWRL–1(2). The hold magnets are now held to this last-mentioned ground; relay 3ASL releases following interruption of its operate path as just described. Relay 2CWPO releases following release of relay 3ASL and this is followed by release of select magents 2SELO (A and B).

The second caller is now terminated at the second connector appearance as pointed out above and the call-waiting circuit functions according to one novel feature thereof whereby to determine whether ringing tone or busy tone will be transmitted to the second caller. Relay 3ASI, which has a slow-to-operate characteristic, operates from the ground on sleeve 302, through #O closed crosspoints of Switch B, break contacts of respective transfer pairs 3AS–1(3), 3SR2–1(3), 3AS1–2(3), 2RS1–1(3), winding of relay 3AS1 to battery; when the relay has fully operated a path is closed at make contact 3AS1–1(3) for activating ring trip circuit 303 and at make contact 3AS1–2(3) for applying busy tone from source 304 to the caller terminated at the second connector appearance of the call-waiting line. Tripping circuit 303 is not disclosed in detail since it may be any one of several ring tripping circuits well known in the art; in this instance it is assumed to be controlled by a gas-filled tube which is activated by application of a predetermined voltage. The second caller is apprised of the busy condition of the call-waiting line by the receipt of the busy tone.

Relay 3AS1, operated, also interrupts at break contact 3AS1–4(3) the holding bridge through resistor 3H2R across the T and R leads to the second connector appearance and opens at break contact 3AS1–3(2) the operate path of relay 2CWRL. Also, relay 3AS1 upon operating partially closes at the make contact of transfer pair 3AS1–5(3) a locking path for itself, opens at break contact 3AS1–6(3) the operate path of relay 3PS, opens at the break contact of transfer pair 3AS1–2(3) a partially completed path for application of "busy ground" to sleeve 302 of the second connector appearance, opens at the break contact of transfer pair 3AS1–5(3) the operate path of relay 3AS, and partially completes at make contact 3AS1–7(2) the operate path of relay 2RS1.

At the time relay 2ON operated and locked in operated position as described above, the operate path of relay 2TOJ was interrupted at break contact 2ON–1(2) and relay 2TOJ released. Relay 2CWBO now operates from battery through make contact 2CWB–5(2), the shunt path to ground via the make contact of transfer pair 2CWPO–4(2), break contact 2ON–2(2) and make contact 2TOJ–1(2) having been interrupted by the operation of relay 2ON and the release of relay 2TOJ. Also, relay 2ON operated closes at make contact 2ON–4(2) a hold path for relay 2CWB when in operated position and partially closes at make contact 2ON–6(2) the operate path of relay 2CWRL.

As the tip and ring leads of the selected call-waiting circuit are now connected through from the call-waiting customer's line, supervisory relay 3S, which is a low-impedance, double-wound relay, operates in series with the line relay of the line finder circuit or the battery feed relay in the switch train; this is followed by operation of relay 3SR1 from ground, make contact of transfer pair 3S–1(3), break contact of transfer pair 3AS–3(3), winding of relay 3SR1 to battery.

Relay 3SR1, operated, partially completes at make contacts 3SR1–1(3) and 3SR1–2(3) a path for connecting high-frequency "call-waiting" tone from source 307 to the call-waiting circuit and thence to the call-waiting customer. This path is completed subsequently as will be described below. Further, relay 3SR1 upon operating opens at break contact 3SR1–3(3) the operate paths for relays 3TR, 3TRA, 3H1, and opens at break contact 3SR1–4(3) the operate path of relay 3D.

In accordance with the normal and well-understood manner, ground is applied to sleeve lead 308 at the time the line is "found" by the line finder, and relay 3LFS is operated by this ground through closed crosspoints of switch A. Relay 3LFS, operated, connects ground at the make contact of transfer pair 3LFS–1(3), to sleeve lead 309 whereby to make busy the first appearance of the call-waiting line at the connector and, at the same time, interrupts at the break contact of the same transfer pair the operate path of relay 3RS. Also, relay 3LFS, operated, partially completes at make contact 3LFS–2(3) a path over which relay 3H1 can operate on a call through the line finder; interrupts at break contact 3LFS–3(2) the operate path of relay 2CWRL before that relay can operate from the ground at make contact 2ON–6(2); partially completes at make contact 3LFS–4(3) a path connecting polarized relay 3PS across the tip and ring leads of the involved call-waiting circuit and partially completes at make contact 3LFS–5(3) a shunt path for relay 3TR. Relay 3PS does not operate at this time since the call originated by the call-waiting customer has not yet been answered and the operate path is open at break contact 3AS1–6(3) of slow-operate relay 3AS1 which is in operated position at this point. In accord with normal and well-understood step-by-step switching operation, the battery polarity on the line is reversed when the called party responds by going off-hook and changed from the "minus-on-ring" condition prevailing during ringing to the "minus-on-tip" condition upon answer by the called partly.

At this time, therefore, that is before the call originated by the call-waiting customer has been answered, the second caller is not actually cut-through to the call-waiting customer (since relay 3PS remains in released condition) but is held at the second connector appearance and continues to hear busy tone from source 304. While the call-waiting circuit has been brought into the connection at the advent of the second call, normal progress of the first call is not interferred with in any manner.

Now when the call originated by the call-waiting customer is answered by the called party going off-hook, the line potential is reversed in the normal manner, but relay 3PS does not operate since the operate path is still open at break contact 3AS1–6(3); the second caller terminated at the second connector appearance continues to receive busy tone from source 304 but call-waiting tone is not transmitted to the call-waiting customer, nor will it be on this particular call.

A1.—Second call received for call-waiting customer after first call has been answered However, for purposes of further description, let it be assumed that the second call for the call-waiting customer's line is received *after* the call originated by the customer has been answered by the first called party. The call will be terminated at the second connector appearance, relay 3ASL will be operated, and the call-waiting circuit will be brought in on the connection as described above. Relays 3LFS and 3S operate as described above and relay 3SR1 operates from ground at the make contact of transfer pair 3S–1(3). The operate path of relay 3AS1 is closed at the closed crosspoints of switch B but this relay has a slow-operate characteristic and does not fully operate immediately. Relay 3PS operates through make contacts 3SR1–5(3) and 3LFS–4(3) before the operate path is interrupted at break contact 3AS1–6(3), the line potential being properly polarized for operation of relay 3PS since the potential reversed upon answer by the first called party.

As before described, relay 3SR1, operated, opens at break contact 3SR1–3(3) the operate paths of relays 3TR, 3TRA, 3H1, and opens at break contact 3SR1–4(3) the operate path of relay 3D. Also as before, paths are partially closed at make contacts 3SR1–1(3) and 3SR1–2(3) for subsequent supply of call-waiting tone from source 307 to the call-waiting customer.

Relay 3PS, operated, closes a path for operating relay 3SR2 from ground, make contact of transfer pair 3S–1(3), make contact 3PS–1(3), diode 3D1, winding of relay 3SR2 to battery; relay 3SR2 upon operating locks to the ground through its make contact 3SR2–2(3) and opens at the break contact of its transfer pair 3SR2–1(3) the operate path of relay 3AS1 this occurring before that slow-to-operate relay had completed its operation.

Relay 3SR2, itself, is given a slow-release characteristic by the connection in shunt with its operate path of the paths via capacitor 3SRC2, diode 3D2 and resistor 3R1R to battery and to ground via resistor 3R2R.

Also, relay 3SR2, operated, closes at the make contact of transfer pair 3SR2–1(3) an operate path for relay 3AS from the ground on sleeve lead 302; opens at break contact 3SR2–4(2) the partially completed operate path of relay 2CWRL; and partially closes at make contact 3SR2–5(3) a holding bridge through resistor 3H2R across the second connector appearance. [The holding bridge remains open at make contact 2H2–1(3)].

Relay 3AS, operated over the above-described path, locks through the make contact of its transfer pair 3AS–1(3) to ground; closes at make contact 3AS–4(3) a holding bridge through resistor 3H1R and make contact 3SR1–6(3) across the line whereby to hold the first call; opens at the break contacts of respective transfer pairs 3AS–5(3) and 3AS–6(3) the talk path to the original connection; partially completes at make contact 3AS–7(2) an operate path for relay 2H2; connects via the make contacts of respective transfer pairs 3AS–5(3) and 3AS–6(3) high-frequency "call-waiting" tone from source 307 to the line for transmission to the call-waiting customer; and opens at the break contact of transfer pair 3AS–3(3) the operate path of relay 3SR1 which starts to release. [Relay 3SR1 has a slow release characteristic.]

At this time, therefore, "call-waiting" tone is being supplied to the call-waiting customer; the talk path to the first-called party is temporarily cut off so that the called party does not hear the tone; and the called party is held by the bridge through resistor 3H1R.

It will be apparent from the above that the novel arrangement provided is such that the function with regard to tone supply varies in accord with the circuit conditions existing when the call-waiting circuit is brought in on the connection. In the first example, that is when the call-waiting circuit is brought in on the connection before the called party on the original connection has answered, relay 3AS1 operates and opens the operate path of relay 3AS and call-waiting tone is not supplied to the call-waiting customer. In the second example, however, when the call-waiting circuit is brought in on the connection after the first-called party has answered, relay 3SR2 operates and closes the operate path of relay 3AS before that path is opened by operation of relay 3AS1; with relay 3AS operated call-waiting tone is supplied to the call-waiting customer. In the first condition, also, with relay 3AS1 operated ringing is tripped and line busy tone is supplied to the second caller terminated at the second connector appearance.

The duration of the call-waiting tone as well as the time the talk path to the original connection is interrupted is determined by the release period of relay 3SR1.

Relay 3SR1, when fully released, interrupts at make contacts 3SR1–6(3) the holding bridge for the original connection; restores at break contacts 3SR1–7(3) and 3SR1–8(3) the talk path to the original called party; partially recloses at break contact 3SR1–4(3) the operate path of relay 3D; interrupts at make contacts 3SR1–2(3) and 3SR1–1(3) the connection of call-waiting tone to the call-waiting station; partially completes at break contact 3SR1–3(3) the operate paths of relays 3TR, 3TRA, and 3H1; and interrupts at make contact 3SR1–5(3) the operate path of relay 3PS. Relay 3PS, released, interrupts one operate path of relay 3SR2 which, however, remains locked via make contact 3SR2–2(3).

The second caller, terminated at the second connector appearance continues to receive audible ringing tone pending a possible decision by the call-waiting customer to transfer to the second caller.

A2.—Call-waiting customer transfers to second call

It will be assumed now that the call-waiting customer, having been alerted to the second call by the call-waiting tone, elects to transfer at least temporarily to the second call while, at the same time the first connection is held. Accordingly the call-waiting customer, usually after informing the first-called party of his intention to transfer, depresses his switch hook momentarily, i.e. the off-hook interval is not of sufficient duration to permit full release of relay 3SR2; this action is commonly referred to as "flashing." [It will be recalled that at this time relays 3LFS, 2ON, 2CWB, 3S, 3SR2, and 3AS are all in operated condition.]

As the switchhook is depressed and the station loop opened, relay 3S releases; this interrupts at the make contact of transfer pair 3S–1(3) the holding path of relay 3SR2 which does not immediately release, however, due to its slow-release characteristic. With relay 3S released and with relay 3SR2 not yet released, a path is closed for operating relay 3TR from ground at the break contact of transfer pair 3S–1(3), break contact 3SR1–3(3), make contact 3SR2–3(3), break contact of transfer pair 3TR–1(3), winding of relay 3TR, resistor 3TRR to battery; relay 3TR operates and locks to ground through the make contact of its transfer pair 3TR–1(3) and make contact 3SR2–6(3). Relay 3TRA did not operate on the operate path traced for relay 3TR since the operate battery for relay 3TRA is shunted to ground via the break contact of transfer pair 3TRA–1(3).

At the time relay 3S released an operate path for relay 3H1 was also closed from the ground at the break contact of transfer pair 3S–1(3), break contact 3SR1–3(3), make contact 3SR2–3(3), break contact of transfer pair 3TR–1(3), break contact of transfer pair 3TRA–2(3), make contact 3LFS–2(3), make contact 3SR2–7(3), winding of relay 3H1 to battery; after operation of relay 3TR as described above, ground for the 3H1 operate path is found via the make contact of transfer pair 3TR–1(3) and make contact 3SR2–6(3). Relay 3H1 upon operating partially closes a holding path at its make contact 3H1–1(3) and closes at its make contact 3H1–2(2) an operate path for relay 2H2 from ground at make contact 3AS–7(2). Relay 3H1, operated, also closes a holding path via make contacts 3TR–2(3) and 3H1–3(3) through resistor 3H3R across the line for holding the original connection to the first-called party.

Relay 2H2 upon operating locks to ground through its make contact 2H2–2(2) and make contact 3AS–7(2) and partially closes at make contact 2H2–1(3) a holding bridge through resistor 3H2R for the second caller terminated at the second connector appearance.

Relay 3TR, operated and locked as described above, opens at the break contact of transfer pair 3TR–1(3) the original path to ground at the break contact of transfer pair 3S–1(3); opens at break contact 3TR–3(3) the partially closed holding path through resistor 3H2R for the second connector appearance; opens at the break contacts of respective transfer pairs 3TR–4(3) and 3TR–5(3) the talk path to the original connection; and closes paths for connecting battery through resistor 3RR, break contact of transfer pair 3TRA–6(3) and make contact of transfer pair 3TR–5(3) to the ring side of the line and connecting ground through resistor 3TR, break contact of transfer pair 3TRA–5(3) and make contact of transfer pair 3TR–4(3) to the tip side of the line; this is a substitute potential for subsequent reoperation of relay 3S.

Now at the end of the "flash" the switchhook is released and relay 3S reoperates as the station loop is reclosed; this action takes place before the end of the release period for relay 3SR2 and that relay now, of course, remains in fully operated condition. The shunt path for its operate battery now being removed at the break contact of transfer pair 3S–1(3), relay 3TRA now operates from ground at make contact 3SR2–6(3), make contact of transfer pair 3TR–1(3), winding of relay 3TRA resistor 3TRAR to battery. Relay 3TRA, operated, disconnects at the break contacts of respective transfer pairs 3TRA–5(3) and 3TRA–6(3) the substitute ground and battery from the call-waiting customer's line, closes at make contact 3TRA–4(3) a supplementary arm of the holding path across the first connection; and closes at the make contacts of respective transfer pairs 3TRA–5(3) and 3TRA–6(3) the path connecting the call-waiting customer to the second caller via the second connector appearance. As the loop is closed at the call-waiting customer's station, ringing is tripped by the bridge through the customer's subset and conversation may now take place between the call-waiting customer and the second caller.

Since the original connection is open at the break contacts of respective transfer pairs 3TR–4(3), 3TRA–8(3), 3TR–5(3), and 3TRA–7(3) the first-called party is excluded from the conversation between the call-waiting customer and the second caller although the original connection is held by the bridge through resistor 3H3R.

A3.—Call-waiting customer transfers back to original connection

After the call-waiting customer has brought in the second call he may, if he so elects transfer back to the original connection provided, of course, that the original caller did not hang up in the interim; if such transfer is to be effected the second call may again be held in the event that the conversation has not been completed.

The second transfer just referred to is effected by a second momentary depression and release of the switchhook, i.e. a second "flash." When the switchhook is depressed and the station loop opened, relay 3S releases and closes at the break contact of transfer pair 3S–1(3) a path shunting the operate battery of relay 3TR to ground via the make contact of transfer pair 3TRA–1(3) and make contact 3LFS–5(3).

Relay 3S, released, interrupts the holding path of relay 3SR2 which starts to release; as pointed out above, however, relay 3SR2 has an appreciable slow-release characteristic and actually does not fully release during the short interval of the "flash."

Relay 3TR, released, transfers at the make contact of transfer pair 3TR–1(3) the holding path for relays 3TRA and 3H1 from the ground at make contact 3SR2–6(3) to the ground at the break contact of transfer pair 3S–1(3); closes at break contact 3TR–3(3) a hold path through resistor 3H2R for the second connector appearance; interrupts at the make contacts of respective transfer pairs 3TR–4(3) and 3TR–5(3) the talk path to the second caller terminated at the second connector appearance; connects at the break contacts of respective transfer pairs 3TR–4(3) and 3TR–5(3) substitute battery and ground to the line through the make contacts of transfer pairs 3TRA–7(3) and 3TRA—8(3) for subsequent reoperation of relay 3S; and opens at make contact 3TR–2(3) one of the legs of the hold path through resistor 3H3R for the original connection. [The hold path is still closed via make contact 3TRA–4(3).]

Now at the termination of the flash and upon reclosure of the station loop relay 3S reoperates; this action takes place before relay 3SR2 has had time to fully release and the relay now, of course, remains operated. With relay 3S reoperated the release of both relays 3H1 and 3TRA follows as the holding path to ground is interrupted at the break contact of transfer pair 3S–1(3).

Relay 3H1, released, interrupts the previous hold path at make contact 3H1–1(3), opens at make contact 3H1–3(3) the holding bridge through resistor 3H3R for the original connection; and interrupts at make contact 3H1–2(2) one of the operate paths for relay 2H2. Relay 2H2, however, is still held via its own make contact 2H2–2(2).

Relay 3TRA, released, opens at make contact 3TRA–4(3) another leg of the holding bridge across the original connection; opens at make contact 3TRA–3(2) another leg of the operate path of relay 2H2; partially recloses at the break contact of transfer pair 3TRA–2(3) the operate path of relay 3H1; partially closes at the break contact of transfer pair 3TRA–1(3) a shunting path for its operate battery; partially closes at the break contacts of respective transfer pairs 3TRA–5(3) and 3TRA–6(3) a substitute battery and ground path for reoperating relay 3S; and recloses at the break contacts of respective transfer pairs 3TRA–8(3) and 3TRA–7(3) the talk path between the call-waiting customer and the original connection.

Conversation can now again take place between the call-waiting customer and the first-called party terminated at the first connector appearance. The second caller terminated at the second connector appearance [provided he has not gone on-hook and terminated the call] is held by the holding bridge through resistor 3H2R but is excluded from the conversation between the call-waiting customer and the first-called party by the "opens" at the make contacts of transfer pairs 3TR–4(3), 3TR–5(3), 3TRA–5(3), and 3TRA–6(3).

Subsequent "flashes" may be utilized to effect further transfers between the call-waiting customer and the two distant points as often as desired provided the first-called party and the second caller remain off-hook and connected.

A4.—First-called party disconnects

Assuming now that the first-called party, that is the called party on the original connection, disconnects and that the disconnect occurs while the call-waiting customer is transferred to the second connector appearance, nothing changes in the call-waiting circuit as the connection through the switch train is held by the 3H3R resistor bridge. Now, however, if this is followed by the call-waiting customer also disconnecting, i.e. going on-hook, relay 3S will release and this will be followed by release of relay 3TR, as a shunt path for the operate battery is closed at the break contact of transfer pair 3S–1(3), and subsequently by the release of relay 3SR2 at the end of its release interval.

Relay 3TR, released, transfers at the break contact of transfer pair 3TR–1(3) the hold path for relays 3TRA and 3H1 from ground at make contact 3SR2–6(3) to ground at the break contact of relay 3S–1(3); closes at break contact 3TR–3(3) the holding bridge through resistor 3H2R for the second connector appearance; opens at make contacts of transfer pairs 3TR–4(3) and 3TR–5(3) the talk path to the second connector appearance; connects at the break contacts of the two transfer pairs just mentioned substitute battery and ground for subsequent reoperation of relay 3S; and interrupts at make contact 3TR–2(3) one leg of the holding bridge across the original connection.

Relay 3SR2, upon subsequent release, opens at make contact 3SR2–2(3) its own locking path; releases relay 3TRA by interrupting at make contact 3SR2–3(3) the path to ground; interrupts at make contact 3SR2–7(3) the partially closed holding path for relay 3H1; and opens at make contact 3SR2–5(3) the holding bridge through resistor 3H2R for the second connector appearance whereby to provide disconnect supervision to the distant end. Also relay 3SR2, released, interrupts at the make contact of transfer pair 3SR2–1(3) one operate path of relay 3AS which, however, remains locked to ground on sleeve 302.

Relay 3TRA, released, partially recloses at the make contact of transfer pair 3TRA–2(3) the operate path of relay 3H1; opens at make contact 3TRA–4(3) the holding bridge through resistor 3H3R for the original connection; opens at make contact 3TRA–3(2) one leg of the operate path for relay 2H2; recloses at the break contacts of respective transfer pairs 3TRA–8(3) and 3TRA–7(3) the path connecting the call-waiting line to the original connection; and partially closes at the break contact of transfer pair 3TRA–1(3) a subsequent path for shunting its operate battery.

Interruption of the holding bridge across the original connection results in release of the switch train and this is followed by release of relay 3LFS previously operated by ground on sleeve 308. Relay 3LFS, released, partially closes at break contact 3LFS–3(2) the operate path of relay 2CWRL.

Relay 3H1, released following release of relay 3SR2, opens its own holding path at make contact 3H1–1(3), provides at make contact 3H1–3(3) a further open in the path of holding bridge 3H3R for the original connection; and interrupts at make contact 3H1–2(2) another leg in the operate paths of relay 2H2.

Under the above-described conditions, the call-waiting customer remains connected to the line finder circuit; the connection on the second connector appearance remains open; and the connection through the line finder and switch train is also open.

A5.—Caller on second connector appearance disconnects

Assuming now for purposes of further description that the second calling party terminated at the second connector appearance disconnects, relay 3AS releases upon removal of ground from sleeve 302 as the switch train drops off. Relay 3AS, released, partially recloses at the break contact of transfer pair 3AS–3(3) an operate path for relay 3SR1; opens at the make contacts of respective transfer pairs 3AS–5(3) and 3AS–6(3) the path for supplying call-waiting tone from source 307 to the call-waiting customer; opens at make contact 3AS–4(3) the holding bridge for holding relay 3S; partially recloses at the break contact of transfer pair 3AS–1(3) the operate path for relay 3AS1; and closes at break contact 3AS–8(2) the operate path for relay 2CWRL from ground at make contact 2ON–6(2).

Relay 2CWRL operates and locks to ground through its make contct 2CWRL–2(2) and make contact 2ON–5(2). This is a checking relay and it will be noted that it operates only when relay 2ON is operated and all of the relays 3RS, 3SR2, 3LFS, 3AS, and 3AS1 are in released position as in the present instance. Now with relay 2CWRL operated the holding path for hold magnets 2HOLD–A and 2HOLD–B is interrupted at break contact 2CWRL–1(2) and the hold magnets release and the crosspoints of switches A and B are opened. Also, relay 2CWB releases, as the hold path is interrupted at break contact 2CWRL–3(2), and this is followed by release of relay 2CWBO as the operate path is interrupted at make contact 2CWB–5(2). Relay 2ON releases as its hold path has been interrupted at break contact 2CWRL–1(2) and this is followed by release of relay 2CWRL itself as its hold and operate paths are interrupted at make contacts 2ON–6(2) and 2ON–5(2) respectively.

All circuits, the call-waiting link, the call-waiting circuit and the call-waiting auxiliary line are now in normal, released, condition.

A6.—Call-waiting customer originates another call before caller on second connector appearance has disconnected For purposes of still further description it will be assumed that, before the second caller on the second connector appearance had disconnected, the call-waiting customer originates another call, that is a call to a "second-party." When the call-waiting customer goes off-hook for initiating a second call, relay 3S operates through the closed station loop and the normal line finder functions are completed as previously described. In this instance, relay 3SR1 does not operate following operation of relay 3S since the operate path is open at the break contact of transfer pair 3AS–3(3); relay 3D does operate, however, from the ground at the make contact of transfer pair 3S–1(3) but does not perform any useful function at this time. When relay 3D operates it closes at make contact 3D–1(3) a path through diode 3DD3 which shunts its operate path and imparts a slow-release characteristic to the relay.

The dial tone supply, dialing, ringing and called station answer take place in the normal manner as previously described and conversation may now take place between the call-waiting subscriber and the second-called party now terminated at the distant end of the switch train.

Relay 3LFS operates in the previously described manner from ground on sleeve 308 and connects at the make contact of transfer pair 3LFS–1(3) ground to sleeve lead 309 whereby to make busy the first connector appearance. Also relay 3LFS, operated, opens the partially closed operate path for relay 2CWRL at break contact 3LFS–3(2), releases relay 3D at break contact 3LFS–5(3), partially closes at make contact 3LFS–4(3) a path connecting relay 3PS across the line, and interrupts at the break contact of transfer pair 3LFS–1(3) the operate path of relay 3RS.

The relays now operated in the call-waiting circuit include 3S; 3AS; 3LFS; 2ON; and 2CWB. The talk path to the second calling party terminated at the second connector appearance is open as relay 3TRA is released.

Assuming now that the second calling party terminated at the second connector appearance disconnects, that is goes on hook, the switch train connected to the connector second appearance releases which is followed by release of relay 3AS. Relay 3AS, released, partially closes at break contact 3AS–8(2) the operate path of relay 2CWRL; partially closes at the break contact of transfer pair 3AS-1(3) the operate path of relay 3AS1; opens at the make contacts of transfer pairs 3AS–5(3) and 3AS–6(3) the path for connecting call-waiting tone to the call-waiting customer; and interrupts at make contact 3AS–4(3) the path connecting the holding bridge across the first connector appearance.

Relay 3SR1 operates following release of relay 3AS from ground at the make contact of transfer pair 3S–1(3), break contact of transfer pair 3AS–3(3), winding of relay 3SR1 to battery. Relay 3SR1, operated partially closes at make contacts 3SR1–2(3) and 3SR1–1(3) the path for subsequent supply of call-waiting tone to the call-waiting subscriber; partially closes at make contact 3SR1–6(3) the holding bridge through resistor 3H1R for the call-waiting line; opens at break contact 3SR–4(3) another point in the partially completed operate path of relay 3D; opens to break contact 3S1–3(3) the partially completed operate path for relays 3TR, 3TRA, and 3H1; and closes at make contact 3SR1–5(3) the path connecting relay 3PS across the line.

In the event, first, that the second-called party, that is the second call initiated by the call-waiting customer, has not yet answered, relay 3PS will not operate due to the polarity on the line at this point; as in previously described situations relays 3S, 3SR1, 3LFS, 2ON, and 2CWB are in operated condition.

Now assuming that an incoming call is received for the call-waiting customer's line, this "second caller" is terminated at the second connector appearance and relay 3AS1 operates as before described from the ground on sleeve lead 302. Relay 3AS1, operated, locks to the sleeve ground through the make contact of its transfer pair 3AS1–2(3); closes at make contact 3AS1–1(3) a path for initiating gas tube ring trip circuit 303 whereby to trip the ringing; closes at make contact 3AS1–2(3) a path for supplying line busy tone from source 304 to the second caller now terminated at the second connector appearance; opens at the break contact of transfer pair 3AS1–5(3) the operate path of relay 3AS; partially closes at make contact 3AS1–7(2) the operate path of relay 2RS1; opens at break contact 3AS1–6(3) the path connecting relay 3PS across the line; and provides at break contact 3AS1–3(2) an open in the operate path of relay 2CWRL.

Now if the call initiated by the call-waiting customer is answered, that is the "second-called party" goes off-hook, the resulting functions are the same as those described in detail above in reference to the first call originated by the call-waiting customer being answered.

In the situation described it was assumed that the second-called party, that is the second call initiated by the call-waiting customer, had not yet answered. For purposes of further description let us assume now that the second-called party has answered and that as a result relay 3PS has operated due to the reversed line potential. Relay 3SR2 now operates from ground at the make contact of transfer pair 3S–1(3), make contact 3PS–1(3), diode 3D1, winding of relay 3SR2 to battery and, upon operating, locks to the ground through its make contact 3SR–2(3). Also relay 3SR2, operated, provides at the break contact of transfer pair 3SR2–1(3) an additional open in the make-busy path for the second connector appearance; partially closes at the make contact of the same transfer pair an operate path for relay 3AS; partially closes at make contact 3SR2–3(3) the operate path of relays 3TR, 3TRA, and 3H1; provides at break contact 3SR2–4(2) an additional open in the operate path of relay 2CWRL; and partially closes at make contact 3SR2–5(3) the holding bridge through resistor 3H2R for the second connector appearance.

Assuming now as before that an incoming call is received for the call-waiting customer's line, this "second caller" is terminated at the second connector appearance and relay 3AS is operated from the ground on sleeve lead 302 via the closed switch crosspoints, break contact of transfer pair 3AS–1(3), make contact of transfer pair 3SR2–1(3), break contact of transfer pair 3AS1–5(3), winding of relay 3AS to battery; relay 3AS operates and locks to the ground through the make contact of its transfer pair 3AS–1(3). Subsequent functions are as described in detail above under the heading, "Second call received for call-waiting customer after first call has been answered."

B.—Calls for call-waiting line terminating at first connector appearance

It will be understood, of course, that calls incoming for the call-waiting customer's line will be terminated at the first connector appearance provided that appearance is idle, this being true whether or not the second connector is idle. For purposes of further description it will be assumed that the call-waiting customer has gone on-hook, the first-called party, that is the party terminated through the switch train as the result of the original connection initiated by the call-waiting customer has not answered or has disconnected, and that the second calling party is still terminated at the second connector appearance and is still off-hook.

Now under the conditions just described if another call is received for the call-waiting line, this incoming call will be terminated at the first connector appearance in the normal manner.

Relay 3RS operates from the ground on sleeve lead 309; closes through make contact 3RS–3(2) and make contact 3AS1–7(2) the operate path of relay 2RS1 that is assuming that the party called on the first connector appearance had not answered before the second connector appearance is seized. Also relay 3RS, operated, partially closes at make contact 3RS–1(3) an operate path for relay 3SR2; partially closes at make contact 3RS–2(3) an operate path for relay 3SR1; partially closes at make contact 3RS–6(3) a shunt path for relay 3TR; partially closes at make contact 3RS–2(3) an operate path for relay 3H1; provides at break contact 3RS–3(2) an additional open in the operate path of relay 2CWRL; opens at the break contact of transfer pair 3RS–5(3) the operate path of relay 3LFS; and closes ground through the make contact of transfer pair 3RS–5(3) to operate the cut-off relay in the call-waiting line circuit thereby opening the line relay from the tip and ring.

Relay 2RS1, if operated as described, locks to ground through its make contact 2RS1–4(2) and opens at the break contact of transfer pair 2RS–1(3) the operate path of relay 3AS1 which relay, however, remains locked to ground through the make contact of transfer pair 3AS1–1(3). Relay 2RS1, operated, also closes at the make contact of transfer pair 2RS–1(3) ground for a future path for marking the second connector appearance busy.

After seizure of the first connector appearance as set forth above, ringing current is passed to the call-waiting customer over the line; while this ringing current passes through the windings of relay 3S, the relay does not operate on the ringing current. When the call-waiting customer responds to the ringing by going off-hook, the ringing is tripped by the closed path through the station loop and conversation may now take place between the call-waiting customer and the caller terminated at the first connector appearance.

Relay 3S operates over the closed station loop and that is followed by operation of relay 3SR2 from ground at the make contact of transfer pair 3S–1(3), make contact 3RS–1(3) diode 3D1, winding of relay 3SR2 to battery. If relay 3AS is not operated, relay 3SR1 also operates following operation of relay 3S from ground at the make contact of transfer pair 3S–1(3), break contact of transfer pair 3AS–3(3) winding of relay 3SR1 to battery; otherwise relay 3SR1 does not operate.

Relay 3SR2, operated as just stated, locks to ground through its make contact 3SR2–2(3); partially establishes at make contacts 3SR2–3(3) and 3SR2–6(3) operate and hold paths for relays 3H1, 3TR, and 3TRA; closes at the make contact of transfer pair 3SR2–1(3) a locking path for relay 3AS1 via the make contact of its transfer pair 3AS1–5(3); and partially closes at make contact 3SR2–5(3) a holding bridge through resistor 3H2R for the second connector appearance.

Relay 3SR1, if operated as just described, partially closes at make contact 3SR1–6(3) a holding bridge through resistor 3H1R for the first connector appearance; partially closes at make contacts 3SR1–2(3) and 3SR1–1(3) a path for supplying call-waiting tone to the call-waiting customer; opens at break contact 3SR1–4(3) the partially established operate path of relay 3D; and opens at break contact 3SR1–3(3) the partially completed operate paths for relays 3TR, 3TRA, and 3H1.

If relay 3AS1 is operated, the caller terminated at the second connector appearance continues to receive line busy tone from source 304 via make contact 3AS1–2(3), otherwise, i.e. if relay 3AS1 is not operated, the second connector connection is held open. Subsequent operations including possible transfer to the second connector appearance are as described above. In the event that the customer on the second connector appearance disconnects [with relay 3SR1 then operated] the second connector appearance is held busy.

B1.—Terminating call received for call-waiting line while all circuits are idle

Let us assume now that with all circuits idle a terminating call is received for the call-waiting customer's line. The first connector appearance is seized, the call-waiting station is rung, and the conversation path is established as just described above.

However, let it be assumed further in the above instance and before the terminating call on the first connector appearance has been answer that a second call for the call-waiting line is received and terminated at the second connector appearance as described above.

Relay 3ASL operates from the ground on sleeve lead 302 and the call-waiting link functions as previously described to select and connect the call-waiting circuit into the connection. Relay 2ON, operates with functions as previously described, and relay 3RS operates from the ground on sleeve lead 309. With regard to first connector appearance functions, ringing to the call-waiting station continues and, with regard to the second connector appearance functions, slow-operate relay 3AS1 starts to operate.

Relay 3RS, operated, opens at the break contact of transfer pair 3RS–5(3) the operate path of relay 3LFS; partially closes at make contact 3RS–3(2) the operate path of relay 2RS1; partially closes at make contact 3RS–1(3) the operate path of relay 3SR2; opens at break contact 3RS–4(3) the operate path of relay 3D; partially closes at make contacts 3RS–6(3) and 3RS–2(3) respectively operate paths for relays 3TR, 3TRA, and 3H1; and opens at break contact 3RS–3(2) the operate path of relay 2CWRL before that relay has operated from the ground at make contact 2ON–6(2). Relay 3RS, operated, also closes a path for operating the cutoff relay in the line circuit.

Relay 3AS1 when fully operated as described above, closes a path at make contact 3AS1–1(3) for initiating ring trip by tripping circuit 303; closes at make contact 3AS1–2(3) a pair for supplying busy tone from source 304 to the caller terminated at the second connector appearance; provides at break contact 3AS1–4(3) another open in the holding bridge across the second connector appearance provides at break contact 3AS1–4(2) another open in the operate path of relay 2CWRL; closes its own locking path at the make contact of transfer pair 3AS1–2(3); opens at the break contact of the transfer pair just mentioned the path for connecting make-busy ground to the second connector appearance; interrupts at break contact 3AS1–6(3) the path for connecting relay 3PS across the line; interrupts at the break contact of transfer pair 3AS1–5(3) the operate path of relay 3AS; and closes at make contact 3AS1–7(2) the operate path of relay 2RS1.

Relay 2RS1, operated as just described, locks to ground through its make contact 2RS1–4(2); partially closes at the make contact of transfer pair 2RS1–1(3) a path for connecting busy-ground to the second connector appearance; opens at the break contact of the transfer pair just mentioned the operate path of relay 3AS1 which is held to ground, however, via the make contact of its transfer pair 3AS1–2(3).

As previously described, relays of the circuit which are operated at this point include 2ON, 2CWB, 3AS1, 3RS, and 2RS1.

Now when the call-waiting customer responds to the ringing by going off-hook, the ringing is tripped through the closed station loop and the path is closed for conversation between the call-waiting customer and the caller terminated at the first connector appearance. Relay 3S operates and this is followed by operation of relays 3SR2 and 3SR1 in the manner and with the functions previously described above.

It will be assumed first now that the call-waiting customer, after conversation with the caller as described above, terminates the connection by going on-hook. When the station loop is opened disconnect supervision is supplied to the distant end; relay 3S releases; relay 3SR2 releases after the release interval thereof; and relay 3SR1 releases, these releases following the removal of ground at the make contact of transfer pair 3S–1(3).

Relay 3TR operates following release of relay 3S from ground at the break contact of transfer pair 3S–1(3), break contact 3SR1–3(3), make contact 3SR2–3(3) [relay 3SR2 not having fully released at this point], break contact of transfer pair 3TR–1(3), winding of relay 3TR, resistor 3TRR to battery; relay 3TR upon operating locks to ground via the make contact of transfer pair 3TR–1(3) and make contact 3SR2–6(3).

Relay 3SR1, released as above described, interrupts at make contacts 3SR1–2(3) and 3SR1–1(3) the path for connecting call-waiting tone to the line and provides at make contact 3SR1–6(3) an additional open in the holding bridge through resistor 3H1R for the first connector appearance.

Relay 3H1, operated as just described, partially closes at make contact 3H1–1(3) a locking path, partially closes at make contact 3H1–2(2) an operate path for relay 2H2, and partially closes at make contact 3H1–3(3) a holding bridge through resistor 3H3R for the first connector appearance.

Relay 3TR, operated as also described above, interrupts at break contact 3TR–3(3) the holding bridge through resistor 3H2R for the second connector appearance; closes at make contact 3TR–2(3) the holding bridge across the first connector appearance; interrupts at the break contacts of transfer pairs 3TR–4(3) and 3 TR–5(3) the talk path to the first connector appearance; and partially closes at the make contacts of the transfer pairs just mentioned a path for supplying substitute battery and ground for subsequent reoperation of relay 3S.

Relay 3SR2, when released at the end of its release interval, interrupts at make contact 3SR2–2(3) its own locking path; provides at make contact 3SR2–5(3) an additional open in the path connecting the holding bridge through resistor 3H2R across the second connector appearance; partially closes at the break contact of transfer pair 3SR2–1(3) a path for connecting make-busy ground to the second connector appearance; closes at the break contact just mentioned the holding path for relay 3AS1; partially closes at break contact 3SR2–4(2) the operate path of relay 2CWRL; and releases relays 3H1 and 3TR by removing ground at make contact 3SR2–6(3).

Relay 3H1, released as just described, opens its locking path at make contact 3H1–1(3); opens at make contact 3H1–2(2) the operate path of relay 2H2; and opens at make contact 3H1–3(3) the bridge across the first connector appearance whereby to transmit disconnect supervision to the distant end.

Relay 3TR, released, returns at the break contact of transfer pair 3TR–1(3) its operate path to its normal condition; partially closes at break contact 3TR–3(3) the path connecting the holding bridge across the second connector appearance; interrupts at make contact 3TR–2(3) the path for connecting the holding bridge across the first connector appearance; and recloses at the break contacts of transfer pairs 3TR–4(3) and 3TR–5(3) the connection to the first connector appearance.

Now if the connection at the first connector appearance is released at the distant end, that is if the caller goes on-hook, the switch train drops off releasing relay 3RS and this is followed by release of relay 2RS1 as the holding path is opened at make contact 3RS–3(2).

Relay 3RS, released, recloses at the break contact of transfer pair 3RS–5(3) the operate path of relay 3LFS: opens at make contact 3RS–1(3) one operate path of relay 3SR2; partially closes at break contact 3RS–4(3) the operate path of relay 3D; opens at make contacts 3RS–6(3) and 3RS–2(3) operate paths of relays 3TR, 3TRA, and 3H1; and partially closes at break contact 3RS–3(2) the operate path of relay 2CWRL.

Relay 2RS1, released, opens at the make contact of transfer pair 2RS1–1(3) the path for connecting make-busy ground to the second connector appearance; interrupts at make contact 2HS1–4(2) its own locking path; and interrupts at make contact 2RS1–1(3) the operate path of relay 3AS1 which, however, holds operated through the make contact of its transfer pair 3AS1–2(3).

The relays remaining operated at this point are 3AS1; 2ON; and 2CWB; the circuit is in the condition described above in connection with call-waiting customer disconnect.

B2.—Terminating call for call-waiting customer's line received after call on first connector appearance has been answered Now assuming that a second call is received for the call-waiting customer's line after the call on the first connector appearance has been answered, call-waiting tone should, of course, be supplied to the call-waiting customer under these circumstances. This is accomplished by the novel arrangement contemplated by the invention, in particular the novel relationship of relays 3AS, 3AS1, and 3SR2.

When the second call is received the PBX connector hunts in the normal manner and cuts through to the second connector appearance; this is followed by operation of relay 3ASL and the call-waiting link connections are completed as described above. Relay 2ON operates with functions as previously described. Relay 3RS operates from the ground on sleeve 309 and the operate path of relay 3AS1 is closed. As pointed out previously, however, relay 3AS1 has a slow-operate characteristic and requires an appreciable interval before full operation.

Relay 3S operates and this is followed by operation of relay 3SR1 from the ground at the make contact of transfer pair 3S–1(3).

Relay 3RS, operated as above described, opens at break contact 3RS–3(2) the operate path of relay 2CWRL before the relay operates from the ground at the make contact of transfer pair 2ON–6(2); opens at break contact 3RS–5(3) the operate path of relay 3LFS; partially closes at make contact 3RS–3(2) the operate path of relay 2RS1; opens at break contact 3RS–4(3) the operate path of relay 3D; partially closes at make contacts 3RS–6(3) and 3RS–2(3) the operate paths of relays 3TR, 3TRA, and 3H1; and closes at make contact 3RS–1(3) an operate path of relay 3SR2 which operates following operation of relay 3S as described above.

Relay 3SR1 operated as described, opens at break contact 3SR1–4(3) the operate path of relay 3D; opens at break contact 3SR1–3(3) the operate paths of relays 3TR, 3TRA, and 3H1; partially closes at make contacts 3SR1–2(3) and 3SR1–1(3) a path for suppling call-waiting tone to the call-waiting subscriber; and partially closes at make contact 3SR1–5(3) the path connecting relay 3PS across the line.

Relay 3SR2, operated, locks through its make contact 3SR2–2(3) to the ground at the make contact of transfer pair 3S–1(3); interrupts at the break contact of transfer pair 3SR2–1(3) the operate path of slow-operate relay 3AS1, this action occurring before relay 3AS1 has had time to operate; partially closes at make contact 3SR2–3(3) an operate path for relays 3TR, 3TRA, and 3H1; provides at break contact 3SR2–4(2) an additional open in the operate path of relay 2CWRL; and partially closes at make contact 3SR2–5(3) the holding bridge through resistor 3H2 for the second connector appearance.

Relay 3AS now operates from the ground on sleeve 302, closed switch crosspoints, make contact of transfer pair 3SR2–1(3), break contact of transfer pair 3AS1–5(3), winding of relay 3AS to battery, and, upon operating, locks to the ground through the make contact of its transfer pair 3AS–1(3). It should be noted that in this particular situation relay 3AS operates, with functions described below, due to the fact that, in accordance with the novel relay interaction provided, relay 3SR2 operates before the slow-operate relay 3AS1 has had time to fully operate even though the operate path therefor has been previously closed. It will be noted that the operate path just described for relay 3AS includes a break contact of transfer pair of relay 3AS1.

Relay 3AS upon operating also closes at make contact 3AS–4(3) the holding bridge through resistor 3H1R across the first connector appearance [relay 3S is held operated by the bridge], interrupts at break contacts of transfer pairs 3AS–5(3) and 3AS–6(3) the talk path between the call-waiting customer and the first connector appearance, opens at the break contact of transfer pair 3AS–3(3) the operate path of relay 3SR1 which starts its slow release, closes at the make contacts of respective transfer pairs 3AS–5(3) and 3AS–6(3) a path for supplying call-waiting tone from source 307 to the call-waiting customer, and partially closes at make contact 3AS–7(2) the operate path of relay 2H2.

During the release interval of relay 3SR1 call-waiting tone is supplied to the call-waiting customer whereby to appraise him of the call terminated at the second connector appearance; this tone is not heard by the caller terminal at the first connector appearance [and held by the 3H1R resistor bridge] since the talk path to the first connector appearance is interrupted as described above.

Relay 3SR1 when fully released interrupts at make contact 3SR1–6(3) the holding bridge across the first connector appearance; closes at break contacts 3SR1–7(3) and 3SR1–8(3) the talk path between the call-waiting customer and the caller terminated at the first connector appearance; partially closes at break contact 3SR1–4(3) the operate path of relay 3D; interrupts at make contacts 3SR1–2(3) and 3SR1–1(3) the path for supplying call-waiting tone to the call-waiting subscriber; partially closes at break contact 3SR1–3(3) the operate path for relays 3TR, 3TRA, and 3H1; and opens at make contact 3SR1–5(3) the path connecting relay 3PS across the line. Conversation may now be resumed between the call-waiting customer and the caller terminated at the first connector appearance.

Assuming on the other hand that the call-waiting customer elects to transfer to the call terminated at the second connector appearance the transfer is initiated by a "flash" of the switchhook and is effected in the manner described in detail above. Now it will be assumed further that, while the call-waiting customer is connected by transfer to the second connector appearance, the distant caller terminated at the first connector appearance disconnects, that is goes on-hook.

When the caller terminated at the first connector appearance goes on-hook, the first connector appearance drops off, relay 3RS releases due to removal of ground from sleeve lead 309.

Relay 3RS, released, recloses at the break contact of transfer pair 3RS–5(3) the operate path of relay 3LFS; interrupts at the make contact of the same transfer pair the connection of ground to sleeve lead 308; opens at break contact 3RS–2(3) the operate path of relay 3SR1; closes at break contact 3RS–4(3) the operate path of relay 3D; opens at make contact 3RS–6(3) one shunt path for relay 3TR; opens at make contact 3RS–1(3) one operate path of relay 3RS2 which, however, is locked to ground through its make contact 3SR2–(3); opens at make contact 3RS–3(2) the operate path of relay 2RS1; partially closes at break contact 3RS–3(2) the operate path of relay 2CWRL; and releases relay 3H1 by opening the operate path at make contact 3RS–2(3).

Relay 3D, operated as above described, closes at make contact 3D–1(3) a shunt path to battery through diode 3DD3 whereby to impart to itself a sufficiently slow release characteristic to allow time for relay 3SR1 to operate; and partially closes at make contact 3D–2(3) the operate path of relay 3SR1 just mentioned.

Relay 3H1, released as described above, opens at make contact 3H1–2(2) the operate path of relay 2H2 which, however, remains locked to ground through its make contact 2H2–2(2); opens at make contact 3H1–3(3) the holding bridge through resistor 3H3R across the line finder thus preventing the operation of the line relay; and opens at make contact 3H1–1(3) its own operate path.

Relays which stand operated at this point include 2ON; 2CWB; 3AS; 3S; 3D; 3SR2; 3TR; 3TRA; and 3H2.

It will be assumed now that the call-waiting customer does, in fact, transfer to the second connector appearance and, further, that while he is so connected the original caller terminated at the first connector appearance has disconnected as described above and another terminating call for the call-waiting customer has arrived. In this instance it is desirable, of course, that the call-waiting customer be apprised of the new call by receiving call-waiting tone so that he may transfer back to that call if he wishes to do so. The connection is established at the first connector appearance, relay 3RS is operated, and ringing current is applied to the line but the line is open at the break contacts of transfer pairs 3TR–4(3) and 3TR–5(3).

Relay 3RS, operated, interrupts at the break contact of transfer pair 3RS–5(3) the operate path of relay 3LFS; connects at the make contact of the same contact pair ground to sleeve lead 308 whereby to operate the line cut-off relay; partly closes at make contact 3RS–3(2) the operate path of relay 2RS1; closes at make contact 3RS–6(3) a shunt path for relay 3TR; closes at make contact 3RS–1(3) one of the legs in the operate paths of relay 3SR2; closes at make contact 3RS–2(3) a path through make contact 3D–2(3) and the make contact of transfer pair 3AS–3(3) for operating relay 3SR1; partially closes at make contact 3RS–2(3) the operate path of relay 3H1; provides at break contact 3RS–3(2) an additional open in the operate path of relay 2CWRL; and interrupts at break contact 3RS–4(3) the operate path of relay 3D which starts to release but which has, as pointed out above, a slow-release characteristic by virtue of the shunt path through diode 3DD3.

Relay 3SR1, operated as above described, provides at break contact 3SR1–3(3) an open in the operate paths of relays 3TR, 3TRA, and 3H1; relays 3TR and 3TRA hold operated to ground at the make contact of transfer pair 3TR–1(3) and make contact 3SR2–6(3). Also, relay 3SR1, operated, provides at break contact 3SR1–4(3) an additional open in the operate path of relay 3D; closes at make contact 3SR1–6(3) a holding bridge through resistor 3HIR across the second connector appearance; partially closes at make contact 3SR1–5(3) the path connecting relay 3PS across the line; and closes at make contacts 3SR1–2(3) and 3SR1–1(3) a path connecting call-waiting tone from source 307 to the call-waiting customer.

For the moment, therefore, call-waiting tone is supplied to the call-waiting customer apprising him of the new call terminated at the first connector appearance; the call at the second connector is held by the bridge through resistor 3H1R and the caller terminated at the first connector appearance continues to receive audible ringing tone.

The condition just described prevails during the release interval of relay 3D, which started to release, as stated above, following operation of relay 3RS.

Relay 3D upon full release interrupts at make contact 3D–2(3) the operate path of relay 3SR1 and opens at make contact 3D–1(3) the path which previously imparted to it the slow-release characteristic. Relay 3SR1 releases and opens at make contact 3SR1–6(3) the holding bridge across the second connector appearance; recloses at break contacts 3SR1–7(3) and 3SR1–8(3) the talk path to the second connector appearance; partially closes at break contact 3SR1–4(3) the operate path of relay 3D; opens at make contacts 3SR1–2(3) and 3SR1–1(3) the path connecting call-waiting tone to the call-waiting customer; partially closes at break contact 3SR1–3(3) a path for releasing relays 3TR and 3TRA and for reoperating relay 3H1; and provides at make contact 3SR1–5(3) an additional open in the path connecting relay 3PS across the line.

Conversation may now be resumed between the call-waiting customer and the caller terminated at the second connector appearance. Transfer to the first connector appearance can now be accomplished by a "flash" as described above.

In the above situation it will be assumed now that the call-waiting customer went on-hook [disconnected] before the new call had terminated at the first connector appearance. Relays operated at this point are 2ON; 2CWB; 3S; 3SR2; 2H2; 3TR; 3TRA; 3D; and 3AS.

When the call-waiting customer goes on-hook and opens the station loop, relay 3S releases and this is followed by full release of relay 3SR2 at the expiration of its release interval. Relay 3S upon releasing also partially closes at the break contact of transfer pair 3S–1(3) a path for shunting the operate path of relay 3TR.

Relay 3SR2, released, opens at make contact 3SR2–2(3) its own locking path; provides at make contact 3SR2–5(3) an additional open in the path connecting the 3H2R resistor bridge across the second connector appearance; partially closes at the break contact of transfer pair 3SR2–1(3) a path for operating relay 3AS1 or for connecting make-busy ground to the second connector appearance; partially closes at break contact 3SR2–4(2) the operate path of relay 2CWRL; provides at make contact 3SR2–7(3) an additional open in the operate path of relay 3H1; and interrupts at make contact 3SR2–3(3) the operate path for relays 3TR and 3TRA which release.

Relay 3TR, released, partially recloses at the break contact of transfer pair 3TR–1(3) its own operate path and that of relay 3H1; partially closes at break contact 3TR–3(3) the path connecting the 3H2R resistor bridge across the second connector appearance; interrupts at make contact 3TR–2(3) the path connecting 3H3R resistor bridge across the first connector appearance; and partially recloses at the break contacts of transfer pairs 3TR–4(3) and 3TR–5(3) the call-waiting line to the first connector appearance. In addition, relay 3TRA, also released, interrupts the resistor bridge path just mentioned at make contact 3TRA–4(3) and recloses the call-waiting line at the break contacts of transfer pairs 3TRA–8(3) and 3TRA–7(3). Also relay 3TRA, operated, recloses its own operate path and that of relay 3H1 at the break contact of transfer pair 3TRA–1(3).

The call-waiting line is connected to the line finder circuit and the first connector appearance and the call-waiting link is held by relay 3AS.

Now it will be assumed that after the call-waiting customer has disconnected as above described another call for the call-waiting customer comes in and is terminated at the first connector appearance. Relays operated at this point are 2ON, 2CWB, 3AS, and 2H2.

After seizure of the first connector appearance, relay 3RS operates from the sleeve ground and ringing current is supplied to the call-waiting station. Relay 3RS, operated, provides at break contact 3RS–3(2) an additional open in the operate path of relay 2CWRL; opens at the break contact of transfer pair 3RS–5(3) the operate path of relay 3LFS; connects at the make contact of the same transfer pair ground to sleeve lead 308 whereby to operate the line cut-off relay; partially closes at make contact 3RS–3(2) the operate path of relay 2RS1; partially closes at make contact 3RS–1(3) the operate path of relay 3SR2; provides at break contact 3RS–4(3) an additional open in the operate path of relay 3D; and partially closes at make contacts 3RS–6(3) and 3RS–2(3) respectively operate paths for relays 3TR and 3H1.

Now when the call-waiting station responds to the ringing by going off-hook the ringing is tripped by the closed station loop, relay 3S operates and this is followed by operation of relay 3SR2. Relay 3SR2, operated, closes at the make contact of transfer pair 3SR2–1(3) the operate path of relay 3AS which is already held operated through the make contact of its transfer pair 3AS–1(3); opens at the break contact of the just mentioned transfer pair 3SR2–1(3) the operate path of relay 3AS1; partially closes at make contact 3SR2–3(3) an operate path for relays 3TR, 3TRA, and 3H1; provides at break contact 3SR2–4(2) an additional open in the operate path of relay 2CWRL; closes at make contact 3SR2–2(3) its own locking path; and closes at make contact 3SR2–5(3) a path connecting the holding bridge through resistor 3H2R across the second connector appearance.

The call-waiting customer is now in talking connection with the caller terminated at the first connector appearance; the party terminated at the second connector appearance is held by the resistor bridge.

It will be assumed now that, while the caller terminated at the second connector appearance is being held and the call-waiting customer is in talking connection with the caller terminated at the first connector appearance, the last-mentioned caller goes on-hook and leaves the connection. At this point operated relays are 2ON, 2CWB, 3S, 3AS, 3SR2, and 2H2.

When the switch train releases from the first connector appearance and after release of relay 3RS as set forth below, the call-waiting customer is connected to the line relay in the line finder circuit [as described above] which functions to connect the line to dial tone in the first selector and to return ground on the sleeve lead 308. Relay 3RS releases as ground is removed from sleeve lead 309 and relay 3SR2 holds to the ground at the make contact of transfer pair 3S–1(3).

Relay 3RS, released, provides at make contact 3RS–3(2) an additional open in the operate path of relay 2RS1; closes at the break contact 3RS–4(3) the operate path of relay 3D; opens at respective make contacts 3RS–6(3) and 3RS–2(3) a shunt path for relay 3TR and an operate path for relay 3H1; opens at make contact 3RS–1(3) a leg in the operate path of relay 3SR2 which, however, remains operated over the locking path mentioned above; interrupts at make contact 3RS–2(3) one operate path of relay 3SR1; partially closes at break contact 3RS–3(2) the operate path of relay 2CWRL; closes at the break contact of transfer pair 3RS–5(3) the operate path of relay 3LFS; and opens at the make contact of the same transfer pair the operate path of the line cut-off relay which releases and reconnects the line relay to the call-waiting line. This will cause the line relay to operate and initiate line finder functions.

Relay 3D, operated as above described, closes at make contact 3D–1(3) the shunt path for imparting the slow-release characteristic thereto, and partially closes at make contact 3D–2(3) an operate path for relay 3SR1.

Relay 3LFS, operated as above described, opens at the break contact of transfer pair 3LFS–1(3) the operate path of relay 3RS; closes at the make contact of the same transfer pair a path for connecting make-busy ground to sleeve lead 309 of the first connector appearance; provides at break contact 3LFS–3(2) another open in the operate path of relay 2CWRL; and partially closes at make contact 3LFS–4(3) a path connecting relay 3PS across the line.

The first connector appearance is now marked "busy" and relays operated are 2ON, 2CWB, 3S, 3AS, 3SR2, and 3LFS.

If the second connector appearance is now released, relay 3AS releases upon removal of ground sleeve 302; this is followed by partial closing at break contact 3AS–8(2) of the operate path of relay 2CWRL; partial closing at the break contact of transfer pair 3AS–1(3) of the operate path of relay 3AS1; interruption at the make contacts of transfer pairs 3AS–5(3) and 3AS–6(3) of the call-waiting tone path and interruption at make contact 3AS–4(3) of the holding bridge path; and closing at the break contact of transfer pair 3AS–3(3) of the operate path of relay 3SR1. Functions following operation of relay 3SR1 are the same as those described above at a corresponding point [following operation of relay 3SR1] in the section, "A6. Call-waiting Customer Originates Another Call before Caller on Second Connector Appearance has Disconnected."

Now, finally, when the call-waiting customer disconnects by going on-hook, relay 3S releases upon opening of the station loop, relay 3LFS releases upon removal of ground from sleeve lead 308; relay 3SR1 releases upon removal of ground at the make contact of transfer pair 3S–1(3); and relay 3SR2 starts its slow release upon removal of ground from its operate path at the contact just mentioned. Relay 2CWRL operates when relay 3SR2 has fully released and locks to ground at make contact 2ON–5(2).

Relay 2CWRL, operated, releases relay 2ON by opening the hold path at break contact 2CWRL–1(2), and releases relay 2CWB by opening the hold path at break contact 2CFRL–3(2). Return of the call-waiting link circuit to normal released condition follows. Relay 2CWRL, itself releases following removal of ground at make contacts 2ON–6(2) and 2ON–5(2).

As clearly set forth above, the novel arrangement contemplated by my invention makes feasible the operation of a group of selectable call-waiting circuits in conjunction with respective call-waiting customers' lines since it is effective to determine after a call-waiting circuit has been brought in on the original connection whether at that time call-waiting tone should be supplied to the call-waiting customer to apprise him of the additional waiting call or whether such action should be inhibited or delayed and only line-busy tone be supplied to the additional caller for the moment. In general, this is determined in accord with the status, answered or unanswered, of the original connection. Thus if the call-waiting customer is involved with an uncompleted call, he is left free of possible disturbance by the call-waitnig tone. When the situation is such that call-waiting tone is desirable, such tone is supplied without delay. In the instance of a call initiated by the call-waiting customer which goes unanswered, call-waiting tone is not suplied even when a second call is received. If the original connection resulted from an incoming call via the first connector appearance, call-waiting tone is delayed until the call-waiting customer has answered. All this is accomplished automatically and efficiently by a novel group of interrelated relay circuits, and it will be clear that the functions of the line with regard to "single call" operation is in no way interferred with or changed.

While specific embodiments of the invention have been selected for detailed disclosure, the invention is not, of course, limited in its application to the embodiments disclosed. The embodiments which have been described should be taken as illustrative rather than restrictive thereof.

What is claimed is:

1. In a telephone switching system of the type including a step-by-step switch train and a hunting type connector, a special service line having two consecutive appearances at the connector, a station set connected to said line, a plurality of call-waiting circuits, means effective when one of said appearances is busied for terminating a call to said special service line at the other of said appearances and for selecting one of said call-waiting circuits and connecting it to said special service line between said station set and said hunting type connector, a source of call-waiting tone included in each of said call-waiting circuits, means effective after selection and connection of a respective call-waiting circuit for supplying tone from the associated tone source to the call-waiting customer, and means for control of said supplying means whereby to delay the tone supply under a first circuit condition, to inhibit the supply under a second circuit condition, and to immediately initiate the supply under a third circuit condition.

2. In a telephone switching system the combination defined by claim 1 further characterized in a source of line-busy tone included in each of said call-waiting circuits, and means also effective after selection and connection of a respective call-waiting circuit for controlling the supply of tone from the associated line-busy tone source to the caller terminated at said other of said connector appearances.

3. In a telephone switching system, the combination defined by claim 2 further characterized in a tripping circuit included in each of said call-waiting circuits and activated by said last-mentioned means.

4. In a telephone switching system, the combination defined by claim 1 further characterized in that said means for control of said supplying means includes a plurality of relays and means for controlling the operation of the respective relays in accord with the condition, answered or unanswered, of the connection by which the one of said appearances is busied when the additional call is received.

5. In a telephone switching system, the combination defined by claim 4 further characterized in that said means for control of said supplying means is effective to inhibit the supply of call-waiting tone to said station set during the time said appearance is busied by an unanswered connection.

6. In a telephone switching system, the combination defined by claim 4, further characterized in means for determining the duration of the interval during which call-waiting tone may be supplied to the station set, said last-mentioned means including a first relay having a slow-release characteristic, a make contact of said relay included in the tone supply path, and means for interrupting the energizing path of said first relay.

7. In a telephone switching system, the combination defined by claim 6, further characterized in a second relay which when operated assumes a slow-release characteristic, a make contact of said second relay included in an operate path of said first relay, and means for interrupting the energizing path of said second relay whereby the duration of said interval may also be determined in part by said second relay.

8. In a telephone switching system, the combination defined by claim 7 further characterized in a third relay, a make contact of said third relay also being included in said supply path, and a make contact and a break contact respectively of said third relay being included in respective operate paths of said first relay whereby said third relay is effective both to partially control the closure of said supply path and to partially control the operation of said first relay.

9. In a telephone switching system, the combination defined by claim 8 further characterized in means for controlling the operation of said third relay in accord with the condition, answered or unanswered, of the connection by which the one of said appearances is busied when the additional call is received.

10. In a telephone switching system, the combination defined by claim 9 further characterized in that said last-mentioned means includes a slow-operate relay, means for closing the energizing path of said slow-operate relay, and contacts of said last-mentioned relay included in the operate path of said third relay.

References Cited

UNITED STATES PATENTS 3,133,995 5/1964 Zarouni.

WILLIAM C. COOPER, Primary Examiner

U.S. Cl. X.R.

179—84